(No Model.)

J. ELLIS.
LUBRICATOR.

No. 347,336. Patented Aug. 17, 1886.

WITNESSES.

INVENTOR.

UNITED STATES PATENT OFFICE.

JOHN ELLIS, OF LYNN, MASSACHUSETTS.

LUBRICATOR.

SPECIFICATION forming part of Letters Patent No. 347,336, dated August 17, 1886.

Application filed November 9, 1885. Serial No. 182,257. (No model.)

*To all whom it may concern:*

Be it known that I, JOHN ELLIS, of Lynn, in the county of Essex and State of Massachusetts, have invented certain new and useful Improvements in Lubricators, of which the following is a full, clear, and exact description.

This invention relates to improvements in lubricators for use in connection with crank-pins of steam-engines and other bearings or journals needing lubrication, and to such lubricators that are constructed and arranged for the oil to automatically flow from the lubricator to the bearing or journal to which the lubricator is attached; and the invention consists of a lubricator for oiling and lubricating the crank-pins of steam-engines and other bearings or journals constructed and arranged for operation, all substantially as hereinafter fully described, reference being had to the accompanying plate of drawings, in which—

Figure 1:
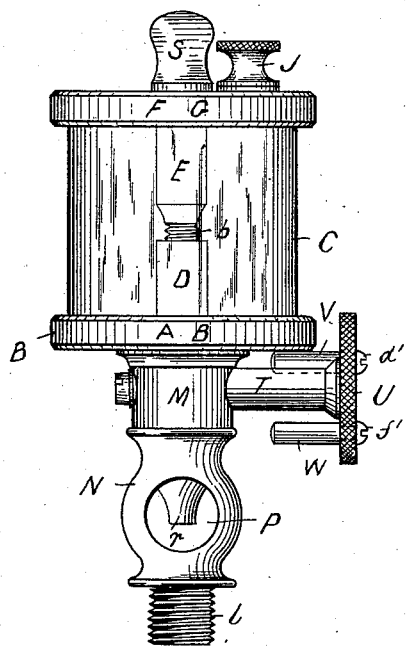
Figure 2:
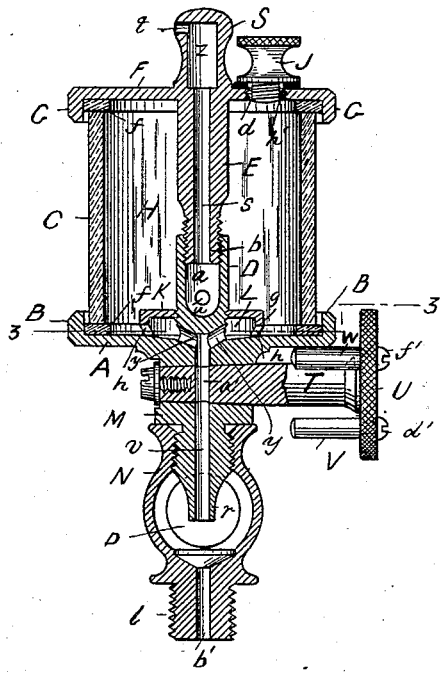
Figure 3:
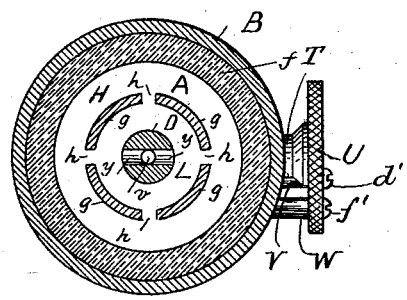
Figure 4:
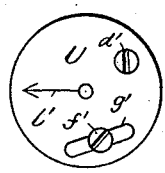

Figure 1 is a side view. Fig. 2 is a vertical cross-section. Fig. 3 is a horizontal section on line 3 3, Fig. 2 and Fig. 4 is a detail view.

In the drawings, A represents a circular base-plate having an upwardly-projecting flange or rim, B, within which fits the lower end of a glass tube or hollow cylinder, C.
D is an upwardly-extending central projection of the base A, having a chamber, $a$, open at its upper end and provided with an internal screw-thread, into which is screwed the lower end, $b$, of a downwardly-extending central rod or stem, E, of a cap-plate, F, having a flanged rim, G, adapted to fit over the upper end of the tube C. Screwing the rod E into the socket $a$ secures the tube C in place between the two plates A F and all parts firmly together. This tube C forms a chamber or receptacle, H, for the oil, which can be put therein through an opening, $d$, in the cap-plate F, adapted to be opened and closed by a screw-plug, J.
To prevent leakage of the oil from the chamber H at the joints between the ends of the tube and the plates A F, and to make them air and water tight, a packing of leather, $f$, or or other suitable packing material is placed thereat.

K is a circular plate adapted to be screwed onto the outside of the central plug, D, within the chamber H, and having a downwardly-extending flange or rim, $g$, which rim, when the plate is screwed down in place, rests and bears by its edge upon the upper surface of the plate A, forming a chamber, L, beneath the plate and around the plug D.

$h$ are apertures or openings in the rim $g$ at its edge, forming communication between the chambers H and L.

M is a central downward extension of the base A, provided with an external screw-thread, on which is screwed the bottom or attaching piece N, which piece at its end $l$ has an external screw-thread, by which it can be attached to the bearing or journal to be lubricated. The lower end, $r$, of the extension M tapers, as shown, and extends into a horizontal opening, P, in the attaching-piece.

The rod or stem E has a central vertical passage, $s$, its upper end open to the outside by a horizontal passage, $t$, in the projection S of the cap-plate F, the lower end of such passage $s$ opening into the chamber $a$ in the plug D. The chamber $a$ has a passage, $u$, opening into the chamber H.

$v$ is a central vertical passage in the extension M, open at its lower end, and at its upper end communicating by a horizontal passage, $y$, in the central projection, D, with the chamber L.

The passage $s$ in the rod E, at its upper end, is enlarged, as shown at $z$, Fig. 2, for the purpose hereinafter referred to.

T is a valve in the extension M, having a transverse passage, $a'$, through it in line when turned in the proper direction with the passage $v$ in the extension M. This valve has a milled head, U, for operating it, so that turning the valve in the proper direction the passage $v$ will be opened or closed to the flow of oil from the chamber H.

The operation of the lubricator is as follows: The lubricator is first properly attached to the bearing or journal to be lubricated, as usual, the valve closed, and the chamber H filled with oil through the opening $d$, and the screw-plug J secured firmly in place. Open the valve and the oil will then flow from the chamber H through the openings $h$ into the chamber L, and thence through the passages $y$ and $v$, and fall, drop by drop, from the end $r$ of the extension M into the passage $b'$ in the attaching-piece N, under the passage v, thence to the bearing, to which the lubricator is attached. As the oil thus passes from the chamber H to the bearing, air passes into the chamber H, through the passage s in the stem E, which allows the oil to flow. The amount of oil desired to flow to the bearing is regulated and controlled by the valve T, and in the following manner: For instance, with the valve partially or fully open, count the number of drops of oil from the end r per minute, and turn the valve in a direction to close or open it until the number of drops of oil required per minute for a proper lubrication of the bearing is secured, and when so adjusted the oil, from the construction and arrangement of the parts of the lubricator, will be constant and uniform in its flow from the chamber H to the bearing so long as there is oil in said chamber. The valve-head has a pin, V, secured firmly by its end to it by a screw, d', which pin projects horizontally toward and under the base-plate, and is secured to the head at a place that, when the valve is turned to the left until it is closed, the pin V will abut against the under side of the base-plate, as shown in Fig. 1. W is another pin secured to the head by a set-screw, f', passing through a slot, g', and in such manner that the pin W can be moved back and forth along said slot, and when in the position desired can be there secured from accidental movement by the set-screw f'. When the valve is turned and set for the required amount of oil to flow from the chamber H, as described, the pin W (its set-screw first being loosened) is moved along the slot g' until it abuts against the under side of the base-plate A, when the pin is secured by the set-screw f' in such position as shown in Fig. 2. By this arrangement of the two pins V W on the valve-head, turning the valve to the left or right until the pin abuts against the base, respectively places the valve in its desired closed or open position. The plug J at each side on its screw portion is cut away, as shown in Fig. 2 at h'. When the oil-chamber is filled with oil, as the screw-plug is screwed into place the air in the chamber H is more or less compressed, which will cause the oil to pass up the passage s, and perhaps flow out at its opening t, and to obviate this the passage s is enlarged, as at z, which gives sufficient room or space for what oil may be forced upward, as described, and therefore its discharge at the opening t is prevented. To reduce this effect on the oil in securing the plug J in place its sides are cut away, as described, which allows air to escape at such places through the opening d, thus reducing the pressure on the oil and lessening the amount of oil forced up the passage s.

In lubricators where the chamber H connects directly with the outlet-passage v, and having no intermediate or small chamber, L, when the lubricator is applied to movable bearings—such as a crank-pin—of a steam-engine the oil will be forced through the outlet-passage irregularly and unevenly, and in such manner that more oil will be used than is necessary, and therefore wasted, and the object of the intermediate and small chamber, L, is to prevent such irregularity and unevenness of the flow of oil, such object being accomplished because the chamber L is small and holds so little oil that the shaking or jarring of the lubricator as it is moved has no effect upon the oil therein to increase its flow therefrom to and through the outlet-passage. The walls of the chamber L also prevent the main body of oil in the chamber H from affecting such flow. The openings h in the walls of the chamber L are preferably small, but are of a size large enough to allow the necessary flow of oil from the chamber H into the chamber L.

The air-passage to the chamber H is arranged for the air to enter the chamber at or near its bottom to be below the surface of the oil in the chamber, for the air to first enter the oil and then pass upward through it into the space above it. This insures a constant and uniform flow of the oil at all times so long as the oil is above the opening n.

The chamber L can be constructed and arranged in any suitable manner and attached in other ways than as described, and the openings h made in any suitable manner, and of a more or less number of them; but the number shown is sufficient for practical use, and it is preferable not to have too many and have them small.

On the face of the valve-head is an arrow, l', the direction in which it points indicating the position of the valve whether open or shut. As shown in Fig. 4, the valve is closed, and if the valve were open it would point upward.

The air-passage s can lead from the chamber H in other ways than as shown; but, as shown, is most satisfactory in its construction and results.

Having thus described my invention, what I claim is—

1. In a lubricator, the combination, with its oil-chamber H, having an air-passage communicating therewith at a point below the surface of the oil, of a chamber, L, having communication with said chamber H and the outlet-passage, for the purpose specified.

2. In a lubricator, the combination, with its oil-chamber H, and an outlet-passage, of a valve, T, provided with a stop, W, adapted to be adjusted, substantially as and for the purpose specified.

3. In a lubricator, the combination, with its oil-chamber and an outlet-passage, of a valve provided with stops V W, to set the valve at its closed and open position, substantially as described.

In testimony whereof I have hereunto set my hand in the presence of two subscribing witnesses.

JOHN ELLIS.

Witnesses:
EDWIN W. BROWN,
HENRY A. CLARK.